US012163098B2

United States Patent
Urakata et al.

(10) Patent No.: US 12,163,098 B2
(45) Date of Patent: Dec. 10, 2024

(54) POWDER FUEL FEED APPARATUS, GASIFIER UNIT, AND INTEGRATED GASIFICATION COMBINED CYCLE AND CONTROL METHOD OF POWDER FUEL FEED APPARATUS

(71) Applicant: Mitsubishi Power, Ltd., Yokohama (JP)

(72) Inventors: Yuichiro Urakata, Kanagawa (JP); Koji Nishimura, Kanagawa (JP); Jun Kasai, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 334 days.

(21) Appl. No.: 17/269,046

(22) PCT Filed: Nov. 8, 2019

(86) PCT No.: PCT/JP2019/043921
§ 371 (c)(1),
(2) Date: Feb. 17, 2021

(87) PCT Pub. No.: WO2020/100746
PCT Pub. Date: May 22, 2020

(65) Prior Publication Data
US 2021/0238490 A1    Aug. 5, 2021

(30) Foreign Application Priority Data

Nov. 14, 2018   (JP) ................................ 2018-213666

(51) Int. Cl.
*F02C 3/26*    (2006.01)
*C10J 3/50*    (2006.01)
*F23K 3/02*    (2006.01)

(52) U.S. Cl.
CPC ............... *C10J 3/50* (2013.01); *F02C 3/26* (2013.01); *F23K 3/02* (2013.01); *C10J 2300/1675* (2013.01); *F05D 2220/32* (2013.01)

(58) Field of Classification Search
CPC ........ C10J 3/50; C10J 2300/1675; F02C 3/26; F23K 3/02; F05D 2220/32
(Continued)

(56) References Cited

U.S. PATENT DOCUMENTS 4,521,139 A    6/1985   Kretschmer et al.
5,666,800 A *  9/1997   Sorensen ............... C10K 1/004
                                                60/39.463

(Continued)

FOREIGN PATENT DOCUMENTS

JP    S52-092928 A    8/1977
JP    S58-024819 A    2/1983
(Continued)

OTHER PUBLICATIONS

International Search Report dated Dec. 3, 2019, issued in counterpart Application No. PCT/JP2019/043921, with English Translation. (5 pages).
(Continued)

*Primary Examiner* — Steven M Sutherland
(74) *Attorney, Agent, or Firm* — WHDA, LLP

(57) ABSTRACT

The object is to provide a powder fuel feed apparatus, a gasifier unit, and an integrated gasification combined cycle and a control method of a powder fuel feed apparatus that can suppress deformation of a sintered metal filter with simple and inexpensive configuration. An embodiment includes: a distributor pipe (89) in which a mixed gas containing moisture and a gas in which pulverized coal and nitrogen transported with the pulverized coal are mixed is transported; and a diluting nitrogen system (90) that, when
(Continued)

a flow velocity of the mixed gas is less than a predetermined threshold, additionally supplies a diluting nitrogen to a mixing chamber (97) connected to the distributor pipe (89) and forming a part of the distributor pipe (89), and the diluting nitrogen system (90) continuously supplies a predetermined flow rate of the diluting nitrogen to the mixing chamber (97).

6 Claims, 5 Drawing Sheets

(58) Field of Classification Search
USPC .............................................. 60/39.464, 781
See application file for complete search history.

(56) References Cited

U.S. PATENT DOCUMENTS

| 2002/0088236 | A1* | 7/2002 | Arar | ................ | F02C 3/30 |
| | | | | | 60/39.12 |
| 2008/0031697 | A1 | 2/2008 | Berggren | | |
| 2013/0140168 | A1 | 6/2013 | Koyama et al. | | |
| 2019/0031430 | A1 | 1/2019 | Urakata et al. | | |
| 2019/0055485 | A1 | 2/2019 | Kasai et al. | | |

FOREIGN PATENT DOCUMENTS

| JP | S63-057425 A | 3/1988 |
| JP | S63-267814 A | 11/1988 |
| JP | H03-095319 U | 9/1991 |
| JP | H06-017741 B2 | 3/1994 |
| JP | 2001-347310 A | 12/2001 |
| JP | 2005-255508 A | 9/2005 |
| JP | 2008-524088 A | 7/2008 |
| JP | 4508443 B2 | 7/2010 |
| JP | 2012-126571 A | 7/2012 |
| JP | 2014-159935 A | 9/2014 |
| JP | 2017-146022 A | 8/2017 |
| WO | 2017/138488 A1 | 8/2017 |

OTHER PUBLICATIONS

Written Opinion dated Dec. 3, 2019, issued in counterpart Application No. PCT/JP2019/043921, with English Translation. (13 pages).

\* cited by examiner

POWDER FUEL FEED APPARATUS, GASIFIER UNIT, AND INTEGRATED GASIFICATION COMBINED CYCLE AND CONTROL METHOD OF POWDER FUEL FEED APPARATUS

TECHNICAL FIELD

The present invention relates to a powder fuel feed apparatus, a gasifier unit, and an integrated gasification combined cycle and a control method of a powder fuel feed apparatus.

BACKGROUND ART

Conventionally, carbonaceous fuel gasification units (coal gasification units) that generate a flammable gas by feeding carbonaceous feedstock such as coal to a gasifier and partially combusting and thereby gasifying the carbonaceous feedstock are known as gasifier units.

In coal gasification units, fuel feed apparatuses that feed powder fuel such as pulverized coal or char into the gasifier together with nitrogen (inert gas) are known. To transport powder fuel, it is required to transport the powder fuel at a flow velocity above a predetermined threshold to prevent precipitation of the powder fuel from occurring inside a transport pipe and causing unstable transportation. To adjust the flow velocity inside the transport pipe, diluting nitrogen is additionally supplied.

Feed of diluting nitrogen from a diluting nitrogen system into a transport pipe is implemented by using a mixing chamber connected to the transport pipe, for example. Some mixing chambers have a filter installed therein so that diluting nitrogen can be well mixed and supplied.

Condensed water may attach to the filter due to occurrence of a reverse flow of a mixed gas of powder fuel and nitrogen from the mixing chamber to the diluting nitrogen system. If water attaches to the filter, a differential pressure may occur between the inside and the outside of the filter.

To address this, for example, PTL 1 discloses that a reverse cleaning gas is forced to flow in the reverse direction in order to peel off and remove dust attached to the surface of a filter.

CITATION LIST

Patent Literature

{PTL 1}
Japanese Patent No. 4508443

SUMMARY OF INVENTION

Technical Problem

In the invention disclosed in PTL 1 described above, however, there is a problem that a configuration for forcing a reverse cleaning gas to flow is additionally required and the installation cost and installation place for the configuration are required.

The present invention has been made in view of the above circumstances and intends to provide a powder fuel feed apparatus, a gasifier unit, and an integrated gasification combined cycle and a control method of a powder fuel feed apparatus that can suppress a reverse flow of a mixed gas with simple and inexpensive configuration.

Solution to Problem

To solve the problem described above, a powder fuel feed apparatus, a gasifier unit, and an integrated gasification combined cycle and a control method of a powder fuel feed apparatus of the present disclosure employ the following solutions.

A powder fuel feed apparatus according to one aspect in some embodiments of the present disclosure includes: a powder transport pipe in which a mixed gas containing moisture and a gas in which powder fuel and an associated inert gas transported with the powder fuel are mixed is transported; and an additional inert gas feed section that, when a flow velocity of the mixed gas is less than a predetermined threshold, additionally supplies an additional inert gas to a mixing chamber connected to the powder transport pipe and arranged in the middle of the powder transport pipe, and the additional inert gas feed section continuously supplies a predetermined flow rate of the additional inert gas to the mixing chamber.

According to the present aspect, the powder transport pipe in which a mixed gas containing powder fuel, an associated inert gas, and moisture is transported and the additional inert gas feed section that additionally supplies an additional inert gas to the mixing chamber when the flow velocity of the mixed gas is less than a predetermined threshold are provided, and the additional inert gas feed section continuously supplies a predetermined flow rate of the additional inert gas to the mixing chamber. It is therefore possible to suppress the mixed gas from flowing backward from the mixing chamber to the additional inert gas feed section during operation such as when the flow velocity of the mixed gas is greater than or equal to the predetermined threshold. If moisture contained in the mixed gas enters the additional inert gas feed section, the moisture is condensed into water, and the water may be retained in the powder transport pipe. Consequently, when the water retained in the powder transport pipe passes through a filter inside the mixing chamber, an increased differential pressure may cause an increase in the differential pressure in the filter. Further, if rust is present inside the additional inert gas feed section, such rust may attach to the filter made of a porous material located inside the mixing chamber during feed of the additional inert gas. According to the present embodiment, it is possible to suppress moisture contained in the mixed gas from entering the additional inert gas feed section and suppress the likelihood that a partial closure occurs in the filter, this increases the differential pressure of the filter, and for some cases, the increased differential pressure causes deformation.

As used herein, "continuously" refers to the entire operable period including a time range in which the in-pipe flow velocity is greater than or equal to a predetermined threshold regardless of whether the powder fuel feed apparatus is in operation or in preparation for operation.

In the aspect described above, the predetermined flow rate of the additional inter gas may be a flow rate that suppresses occurrence of a reverse flow of the mixed gas from the mixing chamber to the additional inter gas feed section.

According to the present aspect, the predetermined flow rate of the additional inter gas is a flow rate that reduces occurrence of a reverse flow of the mixed gas from the mixing chamber to the additional inter gas feed section. It is therefore possible to minimize the flow rate of the inert gas. Further, it is possible to prevent occurrence of a reverse flow of a mixed gas to the additional inert gas feed section beforehand.

In the aspect described above, the additional inert gas feed section may be heated by a heat source to a state higher than or equal to a saturation temperature of moisture contained in the mixed gas.

In the present aspect, the additional inert gas feed section is heated by a heat source to a state higher than or equal to a saturation temperature of moisture contained in the mixed gas. According to the present aspect, moisture contained in the mixed gas can be changed to water vapor without being condensed even when the mixed gas flows backward to the additional inert gas feed section. Since the water vapor is transported together with the inert gas and the mixed gas, it is possible to suppress water from being retained in the additional inert gas feed section and the powder transport pipe.

In the aspect described above, the additional inert gas feed section may include a drain discharge section that discharges drain.

In the present aspect, the additional inert gas feed section includes the drain discharge section that discharges retained drain. According to the present aspect, even when the mixed gas flows backward to the additional inert gas feed section and moisture contained in the mixed gas is condensed into water, the water can be discharged from the additional inert gas feed section as drain before transported to the powder transport pipe. Since drain is discharged from the additional inert gas feed section, it is possible to prevent water from returning to the powder transport pipe and being retained therein, beforehand.

In the aspect described above, the mixing chamber may have a plurality of sintered metal filters each made of cylindrical porous material having a predetermined thickness and an annular intermediate ring connected and fixed to an outer circumference portion of the plurality of sintered metal filters, and a central axis of the plurality of sintered metal filters and a central axis of the intermediate ring may be provided along a central axis direction of the mixing chamber.

In the present aspect, the mixing chamber has the plurality of sintered metal filters made of cylindrical porous material having a predetermined thickness and the intermediate ring connected and fixed to the outer circumference portion of each sintered metal filter, and the central axis of the plurality of sintered metal filters and the central axis of the intermediate ring are provided along the central axis direction of the mixing chamber. According to the present aspect, short cylindrical sintered metal filters can be connected by the intermediate ring, and the connected sintered metal filters can be used as a single long cylindrical shape. Accordingly, the length of each sintered metal filter supported between intermediate rings is shorter than that when the mixing chamber is formed of a single sintered metal filter. Further, both ends of the sintered metal filter are reinforced by the intermediate ring. It is therefore possible to increase the strength against a pressure in the direction orthogonal to the central axis direction of the sintered metal filter.

The mixed gas may flow backward to the additional inert gas feed section, moisture may be condensed into water, and this water may flow to and be retained in the powder transport pipe side. If this water attaches to the sintered metal filter or passes through the sintered metal filter, the differential pressure will increase. Even when the differential pressure increases due to water, it is possible to minimize the influence on deformation of the sintered metal filter due to a rise in the differential pressure. Further, even when deformation occurs, since it is only necessary to replace a targeted short sintered metal filter, it is possible to reduce cost required for replacement.

A gasifier unit according to one aspect in some embodiments of the present disclosure includes: the powder fuel feed apparatus described above; and a gasifier that is supplied with powder fuel from the powder fuel feed apparatus and gasifies the powder fuel.

An integrated gasification combined cycle according to one aspect in some embodiments of the present disclosure includes: the gasifier unit described previously; a gas turbine rotated and driven by at least partial combustion of a raw syngas generated by the gasifier unit; a steam turbine rotated and driven by steam generated by a heat recovery steam generator that introduces a turbine flue gas discharged from the gas turbine; and a generator coupled to rotation and driving of the gas turbine and/or the steam turbine.

A control method of a powder fuel feed apparatus according to one aspect in some embodiments of the present disclosure is a control method of a powder fuel feed apparatus including a powder transport pipe in which a mixed gas containing moisture and a gas in which powder fuel and an associated inert gas transported with the powder fuel are mixed is transported and an additional inert gas feed section that, when a flow velocity of the mixed gas is less than a predetermined threshold, additionally supplies an additional inert gas to a mixing chamber connected to the powder transport pipe and arranged in the middle of the powder transport pipe, and the control method includes a step of: at the additional inert gas feed section, continuously feeding a predetermined flow rate of the additional inert gas to the mixing chamber.

Advantageous Effects of Invention

According to the present disclosure, since a predetermined flow rate of an additional inert gas is supplied continuously from an additional inert gas feed section to a mixing chamber, a reverse flow of a mixed gas containing moisture from a mixing chamber to an additional inert gas feed section can be prevented with a simple and inexpensive configuration.

DESCRIPTION OF EMBODIMENTS

Each embodiment of a powder fuel feed apparatus, a gasifier unit, and an integrated gasification combined cycle and a control method of a powder fuel feed apparatus according to some embodiments of the present disclosure will be described below with reference to the drawings.

Figure 1:
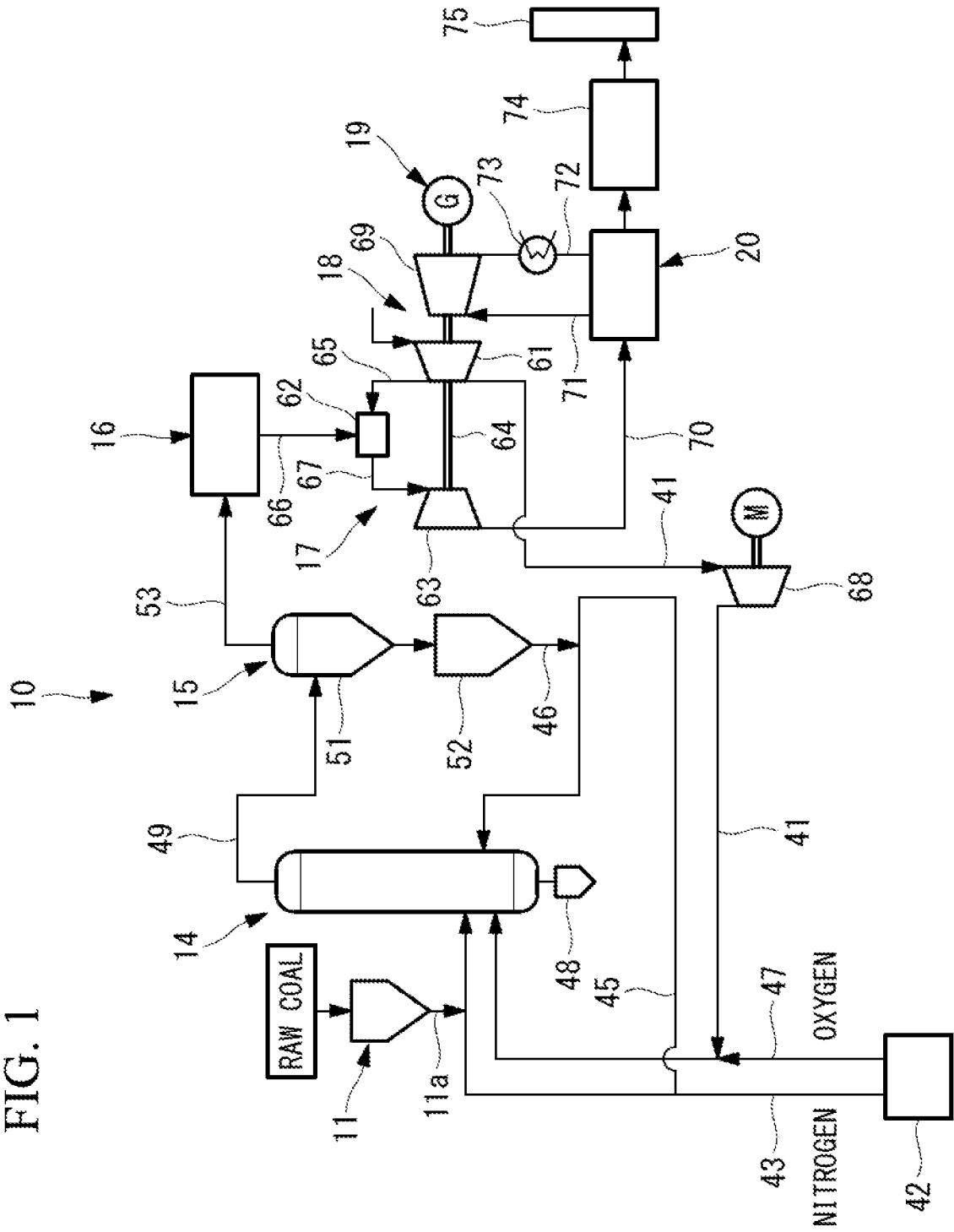
FIG. 1 is a schematic configuration diagram of an integrated coal gasification combined cycle to which a gasifier unit of one aspect of a powder fuel feed apparatus according to some embodiments is applied.

FIG. 1 illustrates a general configuration of an integrated coal gasification combined cycle to which a gasifier unit of one aspect of a powder fuel feed apparatus according to some embodiments of the present disclosure is applied.

An integrated coal gasification combined cycle (IGCC) 10 uses air as a main oxygen containing gas and employs an air combustion system to generate a flammable gas (raw syngas) from fuel in the gasifier unit 14. Further, the integrated coal gasification combined cycle 10 generates power by purifying a raw syngas, which is generated by the gasifier unit 14, by using a gas clean-up unit 16 to produce a fuel gas and then feeding the fuel gas to a gas turbine 17. That is, the integrated coal gasification combined cycle 10 is a power unit of an air combustion system (air blow). As a fuel supplied to the gasifier unit 14, carbonaceous feedstock such as coal is used, for example.

Note that, in the present embodiment, the positional relationships of respective components described using expressions of upper or above and lower or below represent the perpendicularly upward side and the perpendicularly downward side, respectively.

As illustrated in FIG. 1, the integrated coal gasification combined cycle (integrated gasification combined cycle) 10 has a coal feed unit 11, the gasifier unit 14, a char recovery unit 15, the gas clean-up unit 16, the gas turbine 17, a steam turbine 18, a generator 19, and a heat recovery steam generator (HRSG) 20.

The coal feed unit 11 is supplied with coal that is carbonaceous feedstock as raw coal and produces pulverized coal (powder fuel) pulverized into fine particles by pulverizing the coal by using a coal pulverizer (not illustrated) or the like. The pulverized coal produced by the coal feed unit 11 is pressurized by a nitrogen gas (associated inert gas) as a carrier inert gas supplied from an air separation unit 42 described later at the outlet of a coal feed line 11*a*, and the pressurized coal is supplied to the gasifier unit 14. The inert gas refers to an inert gas having an oxygen content of around 5% by volume or less. The inert gas is represented by a nitrogen gas, a carbon dioxide gas, an argon gas, or the like but not necessarily limited to around 5% by volume or less.

The pulverized coal produced by the coal feed unit 11 is supplied to the gasifier unit 14, and char (unreacted contents and ash contents of coal: powder fuel) recovered by the char recovery unit 15 is returned and supplied to the gasifier unit 14 for the reuse purpose.

Further, a compressed-air feed line 41 from the gas turbine 17 (compressor 61) is connected to the gasifier unit 14. A part of the compressed-air compressed by the gas turbine 17 can be pressurized to a predetermined pressure by a gas booster 68 and supplied to the gasifier unit 14. The air separation unit 42 separates and generates nitrogen and oxygen from atmospheric air, and the air separation unit 42 and the gasifier unit 14 are connected to each other via a first nitrogen feed line 43. The coal feed line 11*a* from the coal feed unit 11 is connected to the first nitrogen feed line 43. A second nitrogen feed line 45 branched from the first nitrogen feed line 43 is also connected to the gasifier unit 14. A char return line 46 from the char recovery unit 15 is connected to the second nitrogen feed line 45. The air separation unit 42 is connected to the compressed-air feed line 41 via an oxygen feed line 47. Nitrogen separated by the air separation unit 42 flows through the first nitrogen feed line 43 and the second nitrogen feed line 45 and thereby is used as a carrier gas for coal or char. Oxygen separated by the air separation unit 42 flows through the oxygen feed line 47 and the compressed-air feed line 41 and thereby is used as an oxygen containing gas in the gasifier unit 14.

The gasifier unit 14 has a gasifier in a form of a two-step entrained bed, for example. The gasifier unit 14 produces a raw syngas by partially combusting and thereby gasifying coal (pulverized coal) and char supplied therein with an oxygen containing gas (air, oxygen). A foreign material removal unit 48 that removes a foreign material (slag) mixed in pulverized coal is provided to the gasifier unit 14. A gas generation line 49 that supplies a raw syngas to the char recovery unit 15 is connected to the gasifier unit 14, and a raw syngas containing char can be discharged. A syngas cooler (gas cooler) (not illustrated) may be provided to the gas generation line 49 to feed a raw syngas to the char recovery unit 15 after cooling to a predetermined temperature.

The char recovery unit 15 has a dust collector unit 51 and a feed hopper 52. The dust collector unit 51 is formed of one or a plurality of cyclones or porous filters and can separate char contained in the raw syngas generated by the gasifier unit 14. The raw syngas from which char has been separated is fed to the gas clean-up unit 16 through a gas discharge line 53. The feed hopper 52 stores char separated from the raw syngas by the dust collector unit 51. A bin may be arranged between the dust collector unit 51 and the feed hopper 52, and a plurality of feed hopper s 52 may be connected to the bin. The char return line 46 from the feed hopper 52 is connected to the second nitrogen feed line 45.

The gas clean-up unit 16 removes impurities such as a sulfur compound or a nitrogen compound to perform gas purification on the raw syngas from which char has been separated by the char recovery unit 15. The gas clean-up unit 16 purifies a raw syngas to produce a fuel gas and supplies this fuel gas to the gas turbine 17. Since a sulfur component (such as $H_2S$) is still contained in the raw syngas from which char has been separated, the sulfur component is removed and recovered by using an amine absorption liquid or the like and effectively used in the gas clean-up unit 16.

The gas turbine 17 has a compressor 61, a combustor 62, and a turbine 63, and the compressor 61 and the turbine 63 are coupled by a rotary shaft 64. A compressed-air feed line 65 from the compressor 61, a fuel gas feed line 66 from the gas clean-up unit 16, and a combustion gas feed line 67 extending to the turbine 63 are connected to the combustor 62. The compressed-air feed line 41 extending from the compressor 61 to the gasifier unit 14 is provided to the gas turbine 17, and a gas booster 68 is provided in a middle part thereof. In the combustor 62, a part of the compressed-air supplied from the compressor 61 and at least a part of the fuel gas supplied from the gas clean-up unit 16 are mixed and combusted to generate a combustion gas. The combustor 62 supplies the generated combustion gas to the turbine 63. The turbine 63 rotates and drives the generator 19 by rotating and driving the rotary shaft 64 by using the supplied combustion gas.

The steam turbine 18 has a turbine 69 coupled to the rotary shaft 64 of the gas turbine 17. The generator 19 is coupled to the base end of the rotary shaft 64. A flue gas line 70 from the gas turbine 17 (turbine 63) is connected to the heat recovery steam generator 20. The heat recovery steam generator 20 generates steam by exchanging heat between feedwater to the heat recovery steam generator 20 and a flue gas from the turbine 63. A steam feed line 71 and a steam recovery line 72 are provided between the heat recovery steam generator 20 and the turbine 69 of the steam turbine 18, and a condenser 73 is provided to the steam recovery line 72. Further, the steam generated by the heat recovery steam generator 20 may include steam generated through heat exchange with the raw syngas by a syngas cooler (not illustrated) of the gasifier. In the steam turbine 18, the turbine 69 is rotated and driven by the steam supplied from the heat recovery steam generator 20, the rotary shaft 64 is rotated in response, and thereby the generator 19 is rotated and driven.

A gas purification unit 74 is provided between the outlet of the heat recovery steam generator 20 and a stack 75.

Next, the operation of the integrated coal gasification combined cycle 10 will be described.

In the integrated coal gasification combined cycle 10, once raw coal (coal) is supplied to the coal feed unit 11, the coal is changed to pulverized coal by being pulverized into fine particles in the coal feed unit 11. The pulverized coal produced by the coal feed unit 11 flows through the first nitrogen feed line 43 with nitrogen supplied from the air separation unit 42 and is supplied to the gasifier unit 14. Char recovered by the char recovery unit 15 described later flows through the second nitrogen feed line 45 with nitrogen supplied from the air separation unit 42 and is supplied to the gasifier unit 14. A compressed-air extracted from the gas turbine 17 described later is pressurized by the gas booster 68 and then supplied to the gasifier unit 14 through the compressed-air feed line 41 together with oxygen supplied from the air separation unit 42.

In the gasifier unit 14, the supplied pulverized coal and char are combusted with the compressed-air (oxygen), the pulverized coal and char are gasified, and thereby a raw syngas is generated. The raw syngas is discharged from the gasifier unit 14 through the gas generation line 49 and fed to the char recovery unit 15.

In the char recovery unit 15, first, the raw syngas is supplied to the dust collector unit 51, and pulverized char contained in the raw syngas is separated. The raw syngas from which char has been separated is fed to the gas clean-up unit 16 through the gas discharge line 53. On the other hand, the pulverized char separated from the raw syngas is deposited in the feed hopper 52, returned to the gasifier unit 14 through the char return line 46, and recycled.

The raw syngas from which char has been separated by the char recovery unit 15 is subjected to gas purification in which impurities such as a sulfur compound or a nitrogen compound are removed, and a fuel gas is produced in the gas clean-up unit 16. The compressor 61 generates and supplies a compressed-air to the combustor 62. The combustor 62 generates a combustion gas by mixing and combusting the compressed-air supplied from the compressor 61 and the fuel gas supplied from the gas clean-up unit 16. The turbine 63 is rotated and driven by this combustion gas, and thereby the compressor 61 and the generator 19 are rotated and driven via the rotary shaft 64. In such a way, the gas turbine 17 can generate power.

The heat recovery steam generator 20 generates steam by exchanging heat between feedwater to the heat recovery steam generator 20 and a flue gas discharged from the turbine 63 in the gas turbine 17 and supplies the generated steam to the steam turbine 18. In the steam turbine 18, it is possible to generate power by using the steam supplied from the heat recovery steam generator 20 to rotate and drive the turbine 69 and thereby rotate and drive the generator 19 via the rotary shaft 64.

Note that the gas turbine 17 and the steam turbine 18 may be configured to have different respective shafts to rotate and drive a plurality of generators instead of being configured to share the same shaft to rotate and drive the single generator 19.

Then, in the gas purification unit 74, hazardous substances in the exhaust gas discharged from the heat recovery steam generator 20 are removed, and the purified exhaust gas is emitted from the stack 75 to the atmospheric air.

[Pulverized Coal Feed System]

Next, the pulverized coal feed system (powder fuel feed apparatus) that supplies a mixed gas of pulverized coal and nitrogen (inert gas) from the pulverized coal feed hopper in which the pulverized coal is stored to a pulverized coal burner supplied with pulverized coal (powder) out of a plurality of burners provided in the gasifier unit 14 will be described.

Figure 2:
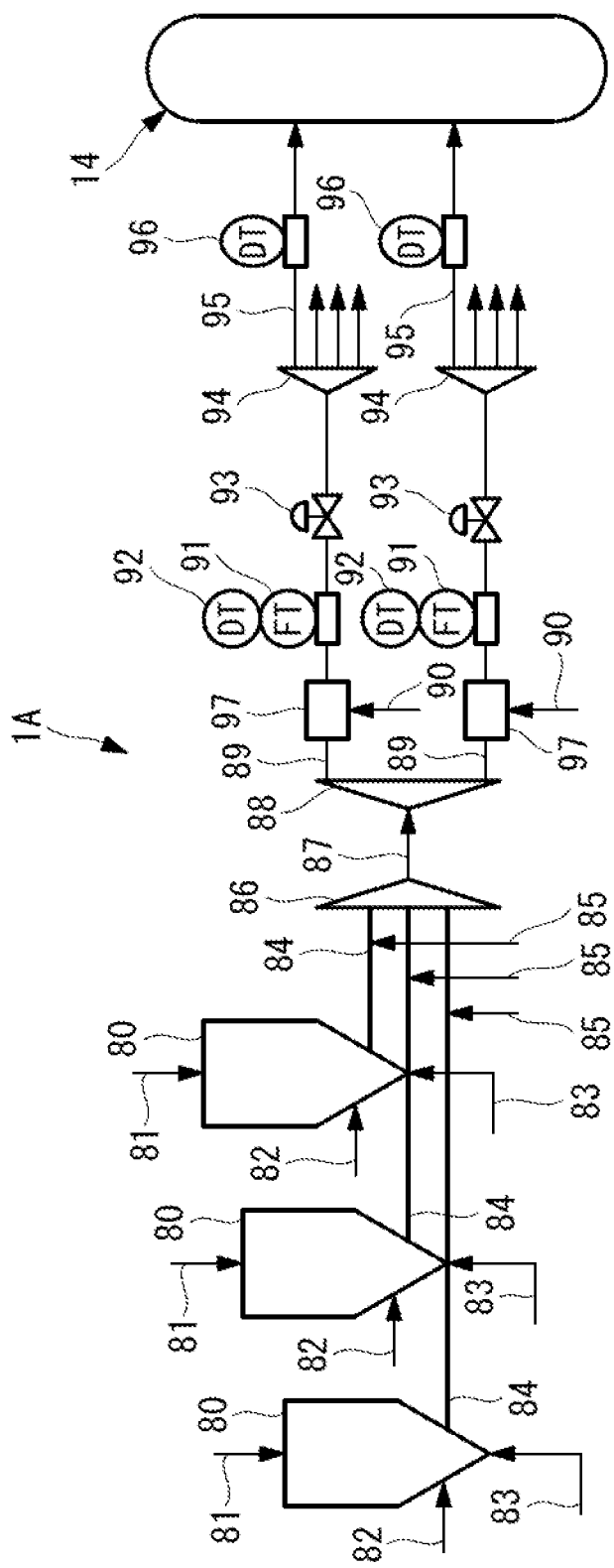
FIG. 2 is a schematic configuration diagram of a pulverized coal feed system of one aspect of a powder fuel feed apparatus according to some embodiments.

FIG. 2 illustrates a general configuration of a pulverized coal feed system of one aspect of a powder fuel feed apparatus according to some embodiments of the present disclosure. A pulverized coal feed system 1A is provided so as to feed pulverized coal from the pulverized coal feed hoppers 80 (hereafter, simply referred to as "hopper 80") to the gasifier unit 14. A plurality of (for example, three in FIG. 2) hoppers 80 are provided. These hoppers 80 are configured to be switched one by one to discharge pulverized coal during use. Therefore, when one of the hoppers 80 is discharging pulverized coal, the remaining hoppers 80 are in a standby state for discharging. An upper pressure-adjustment nitrogen system 81, a lower pressure-adjustment nitrogen system 82, and a fluidization nitrogen system 83 are connected to the hoppers 80.

The upper pressure-adjustment nitrogen system 81 is configured to feed nitrogen from the top of the hopper 80 and used for maintaining the differential pressure constant with respect to the pressure inside the pressure vessel of the gasifier unit 14 during discharging from the hopper 80.

The lower pressure-adjustment nitrogen system 82 applies, to inside of the hopper 80, a pressure for feeding pulverized coal out to the discharge port at the bottom of the hopper 80.

The fluidization nitrogen system 83 fluidizes pulverized coal around the inlet of the transport pipe 84.

The value obtained by summing the levels of the upper pressure-adjustment nitrogen system 81, the lower pressure-adjustment nitrogen system 82, and the fluidization nitrogen system 83 and converting the sum by a nitrogen ratio is the nitrogen flow rate supplied to the hopper 80.

A transport pipe (powder transport pipe) 84 is connected to each hopper 80. A transport pipe seal nitrogen system 85 is connected to each transport pipe 84 on the upstream side of a collector 86. The transport pipe seal nitrogen system 85 increases the pressure inside the transport pipe 84 corresponding to an unused hopper 80 to a predetermined value or higher. Accordingly, even when the unused hopper 80 is opened in the air, the gasifier unit 14 side is sealed.

The downstream ends of respective transport pipes 84 are connected to and merged into the collector 86. The collector 86 is connected to a distributor 88 via a confluence transport pipe 87. A plurality of (for example, two in FIG. 2) distributor pipes (powder transport pipes) 89 are connected to the distributor 88 in parallel.

A mixing chamber 97 connected to a diluting nitrogen system (additional inert gas feed section) 90, a flowmeter 91 and a γ-ray densimeter 92, and a pulverized coal flow regulator 93 are provided to each distributor pipe 89 in this order from the upstream side. The γ-ray densimeter 92 may be any densimeter that can measure the density of pulverized coal in a mixed gas and not limited to a densimeter to measure γ-rays.

The diluting nitrogen system 90 additionally supplies diluting nitrogen (additional inert gas), which is nitrogen used for dilution, into the distributor pipe 89 to adjust the in-pipe flow velocity of a mixed gas of pulverized coal and nitrogen. The diluting nitrogen flow rate, which is the sum of the levels of diluting nitrogen in the diluting nitrogen system 90, is set such that the in-pipe flow velocity of the mixed gas is greater than or equal to a predetermined threshold. The threshold of the in-pipe flow velocity is set from a range of 1.5 m/s to 8 m/s, for example, and adjusted with a diluting nitrogen flow rate. If the in-pipe flow velocity is less than 1.5 m/s, pulverized coal may precipitate in the pipe resulting in unstable transportation, which is not preferable. If the in-pipe flow velocity exceeds 8 m/s, such an excessively high overall flow velocity may increase a pressure loss of the diluting nitrogen system 90 or facilitate wear of the pipe, for example, which is not preferable. Therefore, the diluting nitrogen is supplied to the distributor pipe 89 when the in-pipe flow velocity of the mixed gas is less than the predetermined threshold.

Figure 4:
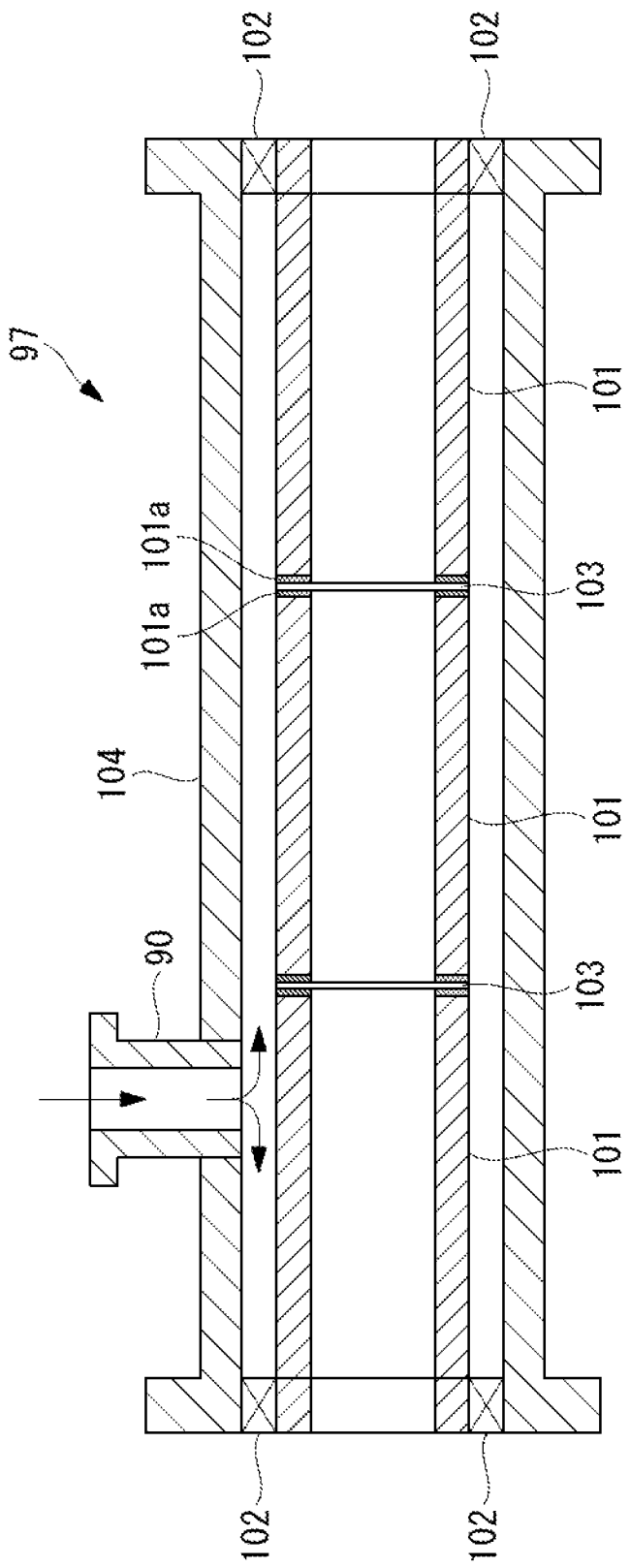
FIG. 4 is a sectional view taken along the central axis of a mixing chamber of one aspect of a powder fuel feed apparatus according to some embodiments.

The mixing chamber 97 is provided on the distributor pipe 89 and provided in the powder transport pipe. FIG. 4 illustrates a sectional view taken along the central axis of the mixing chamber 97. As illustrated in FIG. 4, the mixing chamber 97 has substantially a cylindrical shape and has the double pipe structure having an outer pipe 104 and sintered metal filters 101 therein. The inlet and the outlet of the outer pipe 104 are connected to the distributor pipe 89. Further, the diluting nitrogen system 90 is connected to an upper part in the perpendicular direction of the outer pipe 104 and supplied with diluting nitrogen. For example, with both ends outside the cylinder of the sintered metal filter 101 being sealed and supported via a ground packing 102, the cylindrical sintered metal filters 101 are installed inside the outer pipe 104 of the mixing chamber 97. The mixed gas flowing into the mixing chamber 97 from the distributor pipe 89 (including moisture and a gas in which pulverized coal and nitrogen gas transported together with the pulverized coal are mixed) all flows into the cylinder of the sintered metal filters 101.

The connection form between the mixing chamber 97 and the diluting nitrogen system 90 is not limited to the form described previously. For example, the diluting nitrogen system 90 may be connected to a lower part in the perpendicular direction of the mixing chamber 97, or the diluting nitrogen system 90 may be connected to a part in the horizontal direction of the mixing chamber 97.

The mixing chamber 97 supplies diluting nitrogen supplied from the diluting nitrogen system 90 to the transported pulverized coal from all circumferential directions via the sintered metal filter 101 made of a porous material having a predetermined thickness. Accordingly, a mixed gas in which nitrogen and pulverized coal are substantially evenly mixed is transported.

The flowmeter 91 measures the volumetric flow rate of a mixed gas. The γ-ray densimeter 92 measures the density of pulverized coal in a mixed gas.

The pulverized coal flow regulator 93 is controlled for the aperture and adjusts the flow rate of the mixed gas flowing in the distributor pipe 89.

The downstream end of each distributor pipe 89 is connected to the burner distributor 94. A plurality of (for example, four in FIG. 2) branch pipes (powder transport pipe) 95 are connected to the burner distributor 94 in parallel. A γ-ray densimeter 96 is provided to each branch pipe 95. A burner is connected to the downstream of each branch pipe 95, and the mixed gas is guided inside a gasifier wall of the gasifier unit 14. The γ-ray densimeter 96 may be any densimeter that can measure the density of pulverized coal in a mixed gas and not limited to a densimeter to measure γ-rays.

As described previously, the diluting nitrogen from the diluting nitrogen system 90 is supplied to the mixing chamber 97 of the distributor pipe 89 when the in-pipe flow velocity is less than a predetermined threshold. For example, when the load on the integrated coal gasification combined cycle 10 is low and the flow rate of fuel feed to the gasifier is low, since the in-pipe flow velocity decreases, diluting nitrogen is supplied from the diluting nitrogen system 90. When the flow rate of fuel feed to the gasifier is high and the in-pipe flow velocity satisfies a predetermined threshold, since there is no need for additional feed of nitrogen, feed of diluting nitrogen from the diluting nitrogen system 90 is not performed conventionally.

When no diluting nitrogen is supplied, the mixed gas may flow backward from the mixing chamber 97 to the diluting nitrogen system 90 connected to the mixing chamber 97 due to convection or the like. When the mixed gas contains moisture, the moisture that has flown backward to the diluting nitrogen system 90 is cooled by the atmospheric air via the pipe of the diluting nitrogen system 90, and condensed inside the pipe of the diluting nitrogen system 90. The moisture that has flown backward is condensed into liquid water and retained in the diluting nitrogen system 90. Further, since the diluting nitrogen system 90 is installed on the upper side in the direction of the diluting nitrogen flow to the mixing chamber 97, water may move from the diluting nitrogen system 90 to the mixing chamber 97 due to fluid force of the diluting nitrogen flow.

The water retained in the diluting nitrogen system 90 is transferred to the mixing chamber 97 side in response to start a diluting nitrogen flow, for example, when the diluting nitrogen is supplied to purge the pipe when the integrated coal gasification combined cycle 10 is suspended. The transferred water is retained in the mixing chamber 97 and may attach to or pass through the cylinder inside of sintered metal filter 101 from the cylinder outside of the sintered metal filter 101 (the diluting nitrogen system 90 side) in the mixing chamber 97.

When the nitrogen gas containing water passes from the cylinder outside to the cylinder inside of the cylindrical sintered metal filter 101, a differential pressure occurs between the cylinder inside (on pulverized coal transport path side) and the cylinder outside (between the outer pipe 104 and the sintered metal filter 101) of the sintered metal filter 101. If the nitrogen gas containing water passes through the sintered metal filter 101 and thereby the differential pressure continues to rise, the sintered metal filter 101 is likely to deform toward the cylinder inward direction due to the differential pressure.

Accordingly, in the present embodiment, to suppress inflow of water to the mixing chamber 97, a reverse flow of the mixed gas to the diluting nitrogen system 90 is suppressed.

The diluting nitrogen system 90 continuously supplies a predetermined flow rate of diluting nitrogen to the mixing chamber 97. That is, diluting nitrogen that would otherwise be supplied from the diluting nitrogen system 90 only when the in-pipe flow velocity is less than a predetermined threshold is supplied to the mixing chamber 97 continuously at a predetermined flow rate regardless of the in-pipe flow velocity.

As used herein, "continuously" refers to the entire operable period including a time range in which the in-pipe flow velocity is greater than or equal to a predetermined threshold but except for a complete suspended state regardless of whether the pulverized coal feed system 1A and the integrated coal gasification combined cycle 10 are in operation or in preparation for operation.

With diluting nitrogen continuing to be supplied from the diluting nitrogen system 90, the mixed gas flowing in the mixing chamber 97 is unable to enter the diluting nitrogen system 90 side, and therefore a reverse flow of the mixed gas to the diluting nitrogen system 90 is suppressed.

The predetermined flow rate in the feed of diluting nitrogen from the diluting nitrogen system 90 to the mixing chamber 97 may be a flow rate to reduce occurrence of a reverse flow of the mixed gas from the mixing chamber 97 to the diluting nitrogen system 90.

As has been described above, according to the powder fuel feed apparatus, the gasifier unit, and the integrated gasification combined cycle and the control method of the powder fuel feed apparatus of the present embodiment, the following effects and advantages can be obtained.

The transport pipe 84, the distributor pipe 89, and the branch pipe 95 in which a mixed gas containing pulverized coal, nitrogen, and moisture is transported and the diluting nitrogen system 90 that additionally supplies diluting nitrogen to the mixing chamber 97 when the flow velocity of the mixed gas is less than a predetermined threshold are provided, and the diluting nitrogen system 90 continuously supplies a predetermined flow rate of diluting nitrogen to the mixing chamber 97. Therefore, the mixed gas containing moisture does not enter the diluting nitrogen system 90, and it is possible to suppress the mixed gas from flowing backward from the mixing chamber 97 to the diluting nitrogen system 90.

During operation, the mixed gas flows in a state of being heated at around 80° C. in the distributor pipe 89. On the other hand, when no nitrogen is supplied, the diluting nitrogen system 90 is at around the atmospheric temperature, which is lower than the temperature of the mixed gas.

Since the mixed gas containing moisture is in a heated state, the moisture is contained as a gas. Once such moisture contained in the mixed gas flows backward to and enters the diluting nitrogen system 90 at around the atmospheric temperature, the moisture is cooled, liquefied, and condensed into water in the diluting nitrogen system 90. The water condensed in the diluting nitrogen system 90 is retained in the diluting nitrogen system 90. If the flow velocity of the mixed gas is less than a predetermined threshold during suspension of operation or the like, for example, diluting nitrogen is supplied from the diluting nitrogen system 90 to the mixing chamber 97 to increase the flow velocity of the mixed gas. At this time, however, if water condensed in the diluting nitrogen system 90 is retained, the water will be supplied to the mixing chamber 97 together with diluting nitrogen.

The water supplied to the mixing chamber 97 is retained and may attach to the sintered metal filter 101 in the mixing chamber 97 or may pass through the sintered metal filter 101. If the nitrogen gas containing water passes through the sintered metal filter 101, the sintered metal filter 101 suffers from a partial closure or an increase in the passage resistance due to the water. Thus, the pressure between the outer pipe 104 and the cylinder outside of the sintered metal filter 101 becomes higher than the pressure of the cylinder inside of the sintered metal filter 101, and this causes an increase in the differential pressure. If such an increase in the differential pressure continues to occur, deformation toward the cylinder inward direction is likely to occur in the sintered metal filter 101 due to the pressure difference.

According to the present embodiment, since a mixed gas and moisture contained in the mixed gas are prevented from flowing backward to the diluting nitrogen system 90, moisture is not condensed into water in the diluting nitrogen system 90, no condensed water is transported to the mixing chamber 97 side, and neither attachment nor passage of water to the sintered metal filter 101 occurs. Thus, the differential pressure does not occur, and deformation of the sintered metal filter 101 can be suppressed.

Further, deformation of the sintered metal filter 101 can be suppressed with a simple configuration that continuously supplies diluting nitrogen at a predetermined flow rate.

Further, according to the present embodiment, the predetermined flow rate of diluting nitrogen is a flow rate that reduces occurrence of a reverse flow of the mixed gas from the mixing chamber 97 to the diluting nitrogen system 90. Accordingly, it is possible to minimize the flow rate of diluting nitrogen. Further, it is possible to prevent occurrence of a reverse flow of the mixed gas to the diluting nitrogen system 90 beforehand.

Although the embodiment described above is configured to continuously feed a predetermined flow rate of diluting nitrogen to the mixing chamber, the present embodiment is further configured to heat the diluting nitrogen system. Since other features are the same as those in the embodiment described above, the same components are labeled with the same references, and the description thereof will be omitted.

Figure 3:
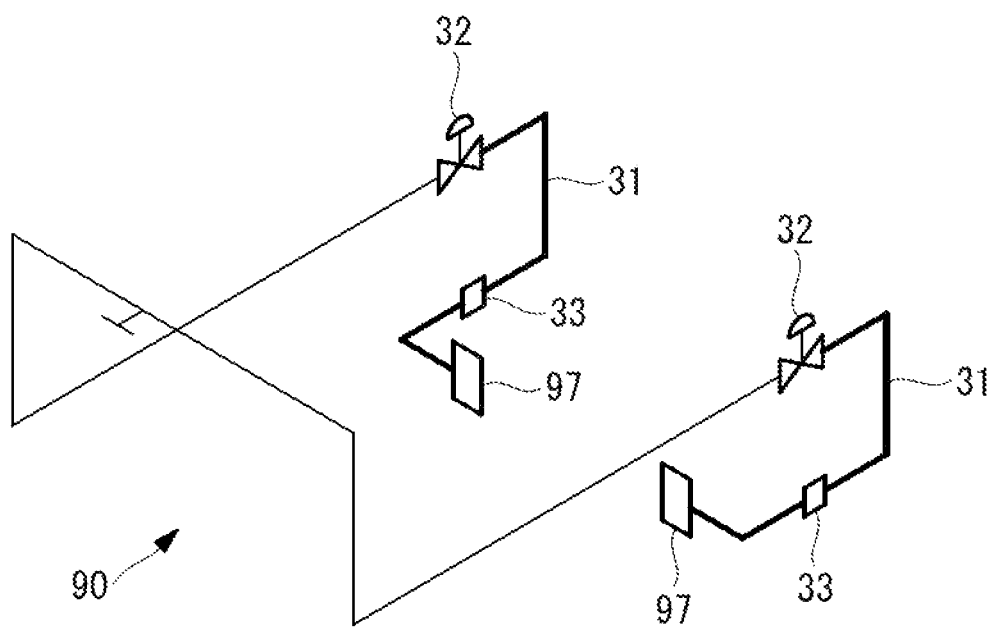
FIG. 3 is a schematic configuration diagram of a diluting nitrogen system of one aspect of a powder fuel feed apparatus according to some embodiments.

FIG. 3 illustrates a schematic configuration diagram of a diluting nitrogen system of one aspect of the powder fuel feed apparatus according to some embodiments of the present disclosure.

As illustrated in FIG. 3, the diluting nitrogen system 90 is configured to feed diluting nitrogen to the mixing chambers 97 provided to two distributor pipes 89, respectively, for example. Diluting nitrogen flow regulators 32 and heat sources 31 that heat pipes (thick lines in FIG. 3) from the diluting nitrogen flow regulators 32 to respective mixing chambers 97 are provided on the diluting nitrogen system 90. Herein, the heat source 31 may be any device that increases the temperature of (or heats) the diluting nitrogen system 90, such as a steam trace, an electric trace, or the like, for example, and any configuration thereof may be employed.

The heat source 31 heats diluting nitrogen flowing through inside the diluting nitrogen system 90 to the atmospheric temperature or higher. Furthermore, the diluting nitrogen may be heated to a temperature at which moisture contained in the mixed gas flowing backward is not condensed in the diluting nitrogen system 90 or a saturation temperature at which moisture contained in the mixed gas is vaporized or higher.

As has been described above, according to the powder fuel feed apparatus, the gasifier unit, and the integrated gasification combined cycle and the control method of the powder fuel feed apparatus of the present embodiment, the following effects and advantages can be obtained.

The diluting nitrogen system 90 is heated by the heat source 31 and thus can prevent moisture from being condensed into water in the diluting nitrogen system 90 even when a mixed gas containing moisture flows backward to the diluting nitrogen system 90. Furthermore, moisture contained in the mixed gas can be maintained to be a gas (water vapor). The water vapor is transported to the mixing chamber 97 together with diluting nitrogen and a mixed gas when the diluting nitrogen is supplied to the mixing chamber 97. It is therefore possible to suppress water from being retained in the diluting nitrogen system 90 and the mixing chamber 97.

Although the embodiment described above is configured to heat the diluting nitrogen system, the present embodiment is to discharge drain from the diluting nitrogen system. Since other features are the same as those in the embodiment described above, the same components are labeled with the same references, and the description thereof will be omitted.

FIG. 3 illustrates a schematic configuration diagram of a diluting nitrogen system of one aspect of the powder fuel feed apparatus according to some embodiments of the present disclosure.

As illustrated in FIG. 3, the diluting nitrogen system 90 is configured to feed diluting nitrogen to the mixing chambers 97 provided to two distributor pipes 89, respectively, for example. Diluting nitrogen flow regulators 32 and drain discharge sections 33 that can discharge water retained in the diluting nitrogen system 90 are provided on the diluting nitrogen system 90.

The drain discharge section 33 can discharge water that has flown backward from the mixing chamber 97 to the diluting nitrogen system 90 and has been cooled by the atmospheric air, condensed, and retained therein. By being provided in the lowermost part in the flow direction of diluting nitrogen on the diluting nitrogen system 90, for example, the drain discharge section 33 can effectively discharge water. Water that has flown backward from the mixing chamber 97 to the diluting nitrogen system 90 and has been condensed and retained flows in the direction of the drain discharge section 33 due to the gravity and is discharged from the drain discharge section 33.

As has been described above, according to the powder fuel feed apparatus, the gasifier unit, and the integrated gasification combined cycle and the control method of the powder fuel feed apparatus of the present embodiment, the following effects and advantages can be obtained.

Since the diluting nitrogen system 90 has the drain discharge section 33 that discharges drain, even when a mixed gas containing moisture flows backward to the diluting nitrogen system 90 and the moisture contained in the mixed gas is condensed into water in the diluting nitrogen system 90, it is possible to discharge water as drain from the drain discharge section 33 of the diluting nitrogen system 90 before the water is transported to the mixing chamber 97. Since drain is discharged from the diluting nitrogen system 90, it is possible to prevent water from being transported to and retained in the mixing chamber 97 beforehand.

Although the embodiment described above is configured to discharge drain from the diluting nitrogen system, intermediate rings for reinforcement of the sintered metal filter are installed in the present embodiment. Since other features are the same as those in the embodiment described above, the same components are labeled with the same references, and the description thereof will be omitted.

Figure 5:
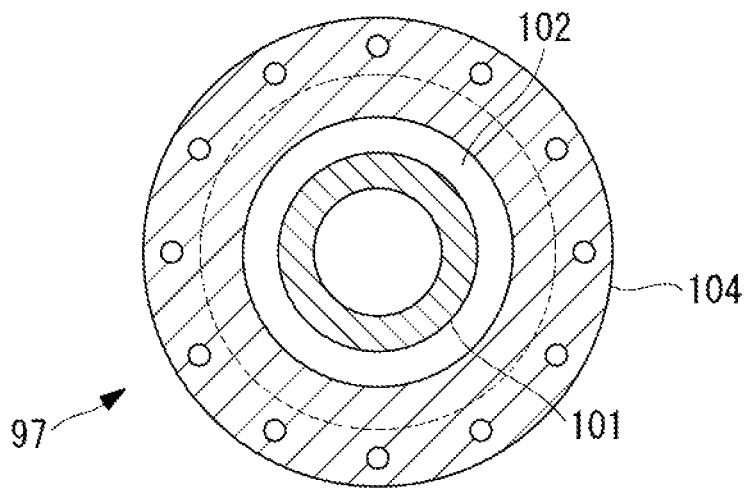
FIG. 5 is a side view on one end side of a mixing chamber of one aspect of a powder fuel feed apparatus according to some embodiments.

FIG. 4 illustrates a sectional view taken along the central axis of a mixing chamber of one aspect of the powder fuel feed apparatus according to some embodiments of the present disclosure. Further, FIG. 5 illustrates a side view on one end side of the mixing chamber of one aspect of the powder fuel feed apparatus according to some embodiments of the present disclosure.

As described previously, the mixing chamber 97 has substantially a cylindrical shape, and the inlet and the outlet are connected to the distributor pipe 89. Further, in the present embodiment, for example, the diluting nitrogen system 90 is connected to the upper side in the perpendicular direction of the mixing chamber 97 and supplied with diluting nitrogen. In the mixing chamber 97, the sintered metal filters 101 each made of a cylindrical porous material having a predetermined thickener are supported and installed via the ground packings 102, for example. As illustrated in FIG. 5, a mixed gas flowing from the distributor pipe 89 into the mixing chamber 97 all flows into the sintered metal filter 101.

Figure 6:
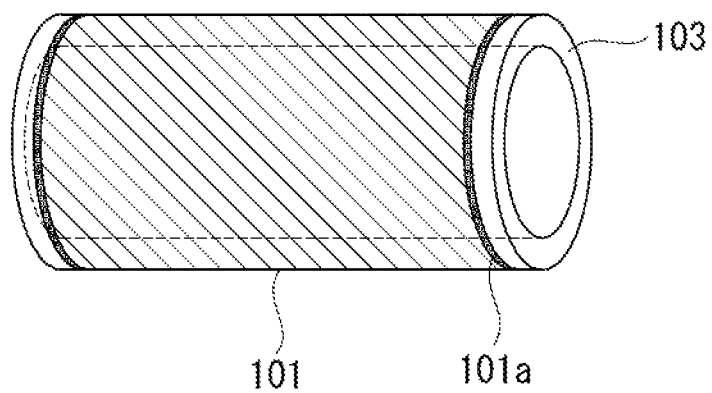
FIG. 6 is a schematic diagram of a part of a sintered metal filter of a mixing chamber of one aspect of a powder fuel feed apparatus according to some embodiments.

FIG. 6 illustrates a schematic diagram of a part of a sintered metal filter of a mixing chamber of one aspect of the powder fuel feed apparatus according to some embodiments of the present disclosure.

As illustrated in FIG. 4 and FIG. 6, a plurality of (three in FIG. 4 as an example) sintered metal filters 101 are installed inside the mixing chamber 97. Each sintered metal filter 101 has a shorter length than the full length in the central axis direction of the mixing chamber 97, and both the mixed gas transport inlet side and outlet side of the sintered metal filter 101 are connected and fixed by intermediate rings 103 via the outer circumference portions 101*a* of the sintered metal filters 101. The intermediate rings 103 and the sintered metal filters 101 are alternatingly connected and fixed to each other along the central axis as illustrated in FIG. 4, and thereby one set of sintered metal filters 101 having the same length as the full length of the mixing chamber 97 is formed. The connection between the sintered metal filter 101 and the intermediate ring 103 is fixed by welding, for example.

The intermediate ring 103 is made of stainless steel, for example, exhibits a higher strength than the sintered metal filter 101, and is less likely to be deformed against stress load. In the manufacturing process of the sintered metal filter 101 installed inside the mixing chamber 97, the sintered metal filter 101 having substantially the same length as the full length of the mixing chamber 97 may be cut at two or more positions, and the intermediate ring 103 may be welded and fixed to each cut position. However, the manufacturing process is not limited to the above, and other processes may be employed.

The intermediate ring 103 is a ring-shaped member having a width in the diameter direction. In the present embodiment, the width in the diameter direction of the intermediate ring 103 and the thickness in the diameter direction of the sintered metal filter 101 are the same.

As has been described above, according to the powder fuel feed apparatus, the gasifier unit, and the integrated gasification combined cycle and the control method of the powder fuel feed apparatus of the present embodiment, the following effects and advantages can be obtained.

The mixing chamber 97 has the plurality of sintered metal filters 101 each made of a cylindrical porous material having a predetermined thickness and the intermediate rings 103 connected and fixed to the outer circumference portions 101*a* of respective sintered metal filters 101, and the central axis of the plurality of sintered metal filters 101 and the central axis of the intermediate rings 103 are provided along the central axis direction of the mixing chamber 97. Therefore, short cylindrical sintered metal filters 101 can be connected by the intermediate rings 103 and can be used as a single long cylindrical sintered metal filter 101. Accordingly, the length of each sintered metal filter 101 is shorter than that when a filter of the mixing chamber 97 is formed of only one sintered metal filter 101, and both ends of the sintered metal filter 101 are reinforced by the intermediate rings 103. Thus, the strength against a pressure in the direction orthogonal to the central axis direction of the sintered metal filter 101 can be enhanced. Even if a mixed gas containing moisture flows backward to the diluting nitrogen system 90, the moisture is condensed into water, and this water is transported to and retained on the mixing chamber 97 side, it is possible to minimize deformation of the sintered metal filter 101 caused by an increase in the differential pressure due to water attached to or passing through the sintered metal filter 101.

Further, when the sintered metal filter 101 is deformed, since it is necessary to replace only the targeted short sintered metal filter 101, it is possible to reduce cost required for replacement.

Although each embodiment of the present invention has been described in detail with reference to the drawings, the specific configuration is not limited to the embodiment. For example, respective embodiments may be implemented in combination as appropriate. Accordingly, it is possible to further prevent moisture that has flown back to the diluting nitrogen system 90 from being retained in the sintered metal filter 101.

REFERENCE SIGNS LIST

1A pulverized coal feed system (powder fuel feed apparatus)
10 integrated coal gasification combined cycle (integrated gasification combined cycle)
11 coal feeding unit
11a coal feeding line
14 gasifier unit
15 char recovery unit
16 gas clean-up unit
17 gas turbine
18 steam turbine
19 generator
20 heat recovery steam generator
33 drain discharge section
41 compressed-air feed line
42 air separation unit
43 first nitrogen feed line
45 second nitrogen feed line
46 char return line
47 oxygen feed line
49 gas generation line
51 dust collector unit
52 feed hopper
53 gas discharge line
61 compressor
62 combustor
63 turbine
64 rotary shaft
65 compressed-air feed line
66 fuel gas feed line
67 combustion gas feed line
68 gas booster
69 turbine
70 flue gas line
71 steam feed line
72 steam recovery line
74 gas purification unit
75 stack
80 pulverized coal feed hopper (hopper)
81 upper pressure-adjustment nitrogen system
82 lower pressure-adjustment nitrogen system
83 fluidization nitrogen system
84 transport pipe (powder transport pipe)
85 transport pipe seal nitrogen system
86 collector
87 confluence transport pipe
88 distributor
89 distributor pipe (powder transport pipe)
90 diluting nitrogen system (additional inert gas feed section)
91 flowmeter
92 γ-ray densimeter
93 pulverized coal flow regulator
94 burner distributor
95 branch pipe (powder transport pipe)
96 γ-ray densimeter
97 mixing chamber
101 sintered metal filter
101a outer circumferential portion
102 ground packing
103 intermediate ring

The invention claimed is:

1. A powder fuel feed apparatus comprising:
a powder transport pipe;
a mixing chamber; and
an additional inert gas feed section,
wherein the powder transport pipe is configured to transport a mixed gas containing moisture and a gas in which powder fuel and an associated inert gas transported with the powder fuel are mixed,
wherein the mixing chamber is configured to be connected to and arranged in the middle of the powder transport pipe,
wherein, when a flow velocity of the mixed gas is less than a predetermined threshold, the additional inert gas feed section is configured to additionally supply an additional inert gas to the mixing chamber,
wherein the additional inert gas feed section is configured to continuously supply a predetermined flow rate of the additional inert gas to the mixing chamber,
wherein the predetermined flow rate of the additional inert gas is a flow rate that suppresses occurrence of a reverse flow of the mixed gas from the mixing chamber to the additional inert gas feed section,
wherein the mixing chamber has a plurality of sintered metal filters each made of cylindrical porous material having a predetermined thickness, and
an annular intermediate ring connected and fixed to an outer circumference portion of each of the plurality of sintered metal filters, and
wherein a central axis of the plurality of sintered metal filters and a central axis of the annular intermediate ring are provided along a central axis direction of the mixing chamber.

2. The powder fuel feed apparatus according to claim 1, wherein the additional inert gas feed section is configured to be heated by a heat source to a state higher than or equal to a saturation temperature of moisture contained in the mixed gas.

3. The powder fuel feed apparatus according to claim 1, wherein the additional inert gas feed section comprises a drain discharge section that discharges drain.

4. A gasifier unit comprising:
the powder fuel feed apparatus according to claim 1; and
a gasifier that is configured to be supplied with powder fuel from the powder fuel feed apparatus and gasifies the powder fuel.

5. An integrated gasification combined cycle comprising:
the gasifier unit according to claim 4;
a gas turbine configured to be rotated and driven by at least partial combustion of a raw syngas generated by the gasifier unit;
a steam turbine configured to be rotated and driven by steam generated by a heat recovery steam generator that introduces a turbine flue gas discharged from the gas turbine; and
a generator coupled to rotation and driving of the gas turbine and/or the steam turbine.

6. A control method of a powder fuel feed apparatus including
a powder transport pipe in which a mixed gas containing moisture and a gas in which powder fuel and an associated inert gas transported with the powder fuel are mixed is transported, and
an additional inert gas feed section that, when a flow velocity of the mixed gas is less than a predetermined threshold, additionally supplies an additional inert gas to a mixing chamber connected to the powder transport pipe and arranged in the middle of the powder transport pipe, the control method comprising a step of:
at the additional inert gas feed section, continuously feeding a predetermined flow rate of the additional inert gas to the mixing chamber,
wherein the predetermined flow rate of the additional inert gas is a flow rate that suppresses occurrence of a reverse flow of the mixed gas from the mixing chamber to the additional inert gas feed section,
wherein the mixing chamber has
a plurality of sintered metal filters each made of cylindrical porous material having a predetermined thickness, and
an annular intermediate ring connected and fixed to an outer circumference portion of each of the plurality of sintered metal filters, and
wherein a central axis of the plurality of sintered metal filters and a central axis of the annular intermediate ring are provided along a central axis direction of the mixing chamber.

\* \* \* \* \*